(12) United States Patent
Johnson et al.

(10) Patent No.: US 9,333,466 B2
(45) Date of Patent: May 10, 2016

(54) DIESEL EXHAUST FLUID INJECTOR ASSEMBLY

(71) Applicants: Claude M. Johnson, Columbus, IN (US); Mark Yragui, Coto de Caza, CA (US); Herman Van Niekerk, Fullerton, CA (US); Farzan Roshdieh, Yorba Linda, CA (US)

(72) Inventors: Claude M. Johnson, Columbus, IN (US); Mark Yragui, Coto de Caza, CA (US); Herman Van Niekerk, Fullerton, CA (US); Farzan Roshdieh, Yorba Linda, CA (US)

(73) Assignees: CUMMINS POWERGEN IP, INC., Minneapolis, MN (US); CUMMINS CAL PACIFIC, LLC, Irvine, CA (US)

( * ) Notice: Subject to any disclaimer, the term of this patent is extended or adjusted under 35 U.S.C. 154(b) by 579 days.

(21) Appl. No.: 13/706,082

(22) Filed: Dec. 5, 2012

(65) Prior Publication Data

US 2014/0154142 A1    Jun. 5, 2014

(51) Int. Cl.
| | | |
|---|---|---|
| *B01D 50/00* | (2006.01) | |
| *B01F 5/02* | (2006.01) | |
| *B01F 3/04* | (2006.01) | |
| *F01N 3/20* | (2006.01) | |
| *F01N 3/36* | (2006.01) | |
| *F01N 3/025* | (2006.01) | |

(52) U.S. Cl.
CPC ........... *B01F 5/0268* (2013.01); *B01F 3/04049* (2013.01); *F01N 3/0253* (2013.01); *F01N 3/206* (2013.01); *F01N 3/2066* (2013.01); *F01N 3/36* (2013.01); *B01F 2215/0422* (2013.01); *F01N 2260/022* (2013.01); *F01N 2610/02* (2013.01); *F01N 2610/03* (2013.01); *F01N 2610/1453* (2013.01); *Y02T 10/24* (2013.01); *Y10T 137/87587* (2015.04)

(58) Field of Classification Search
CPC ... F01N 3/206; F01N 3/2053; F01N 2610/02; F01N 2610/1453; B01F 5/0268
USPC .................................. 422/168, 176; 137/888
See application file for complete search history.

(56) References Cited

U.S. PATENT DOCUMENTS

| | | |
|---|---|---|
| 3,092,757 A | 6/1963 | Rosenfeld et al. |
| 3,749,130 A | 7/1973 | Howitt et al. |

(Continued)

FOREIGN PATENT DOCUMENTS

| | | |
|---|---|---|
| EP | 1612916 A1 | 1/2006 |
| EP | 1978241 B1 | 7/2010 |

(Continued)

OTHER PUBLICATIONS

"Control of Emissions of Air Pollution From Nonroad Diesel Engines and Fuel", Environmental Protection Agency, Federal Register, vol. 69, No. 124, Jun. 29, 2004, 316 pages.

(Continued)

*Primary Examiner* — Tom P Duong
(74) *Attorney, Agent, or Firm* — Faegre Baker Daniels LLP

(57) ABSTRACT

A diesel exhaust fluid (DEF) injector assembly is provided for use in an engine exhaust after-treatment system. The DEF injector assembly includes an injector body having a fluid inlet and a fluid outlet that delivers the DEF to an engine exhaust stream. The DEF injector assembly may also include a valve that opens and closes the fluid outlet of the injector body. An exemplary DEF injector assembly further includes an impact structure with an inclined impact surface that disperses and distributes the injected DEF into the engine exhaust stream. Another exemplary DEF injector assembly further includes a shroud that insulates the injector body.

24 Claims, 9 Drawing Sheets

(56) References Cited

U.S. PATENT DOCUMENTS

| | | | |
|---|---|---|---|
| 4,219,738 A | 8/1980 | Griesinger |
| 4,243,893 A | 1/1981 | Sten |
| 4,608,946 A | 9/1986 | Tanaka et al. |
| 4,733,750 A | 3/1988 | Poirier et al. |
| 4,835,405 A | 5/1989 | Clancey et al. |
| 4,907,546 A | 3/1990 | Ishii et al. |
| 5,155,995 A | 10/1992 | Kinnear et al. |
| 5,694,889 A | 12/1997 | Ball et al. |
| 6,028,369 A | 2/2000 | Hirose et al. |
| 6,401,455 B1 | 6/2002 | Mathes et al. |
| 6,450,133 B1 | 9/2002 | Bernard et al. |
| 6,630,756 B2 | 10/2003 | Kern et al. |
| 6,784,574 B2 | 8/2004 | Turner et al. |
| 6,865,883 B2 | 3/2005 | Gomulka |
| 6,895,903 B2 | 5/2005 | Campion |
| 7,007,966 B2 | 3/2006 | Campion |
| 7,314,397 B2 | 1/2008 | Sodemann et al. |
| 7,467,749 B2 | 12/2008 | Tarabulski et al. |
| 7,482,705 B2 | 1/2009 | Piercey, III |
| 8,146,349 B2 | 4/2012 | Bloms et al. |
| 8,196,555 B2 | 6/2012 | Ikeda et al. |
| 8,327,623 B2 | 12/2012 | Raman |
| 8,459,216 B2 | 6/2013 | Klejeski et al. |
| 8,826,649 B2 | 9/2014 | Li et al. |
| 9,010,096 B2 | 4/2015 | Golin et al. |
| 2002/0119081 A1 | 8/2002 | Latino et al. |
| 2003/0093992 A1 | 5/2003 | Suga et al. |
| 2003/0106309 A1 | 6/2003 | Morimoto et al. |
| 2004/0172935 A1 | 9/2004 | Otake et al. |
| 2004/0226287 A1 | 11/2004 | Edgar et al. |
| 2006/0080971 A1 | 4/2006 | Smith et al. |
| 2007/0130923 A1 | 6/2007 | Dye et al. |
| 2007/0132243 A1 | 6/2007 | Wurtele et al. |
| 2008/0129053 A1 | 6/2008 | Piercey |
| 2008/0276599 A1 | 11/2008 | Hosaka |
| 2008/0311010 A1 | 12/2008 | Boe |
| 2009/0044524 A1 | 2/2009 | Fujino |
| 2009/0173063 A1 | 7/2009 | Boorse et al. |
| 2010/0005791 A1 | 1/2010 | Ranganathan et al. |
| 2010/0023200 A1 | 1/2010 | Kurrle et al. |
| 2010/0071351 A1 | 3/2010 | Nishimura et al. |
| 2010/0082224 A1* | 4/2010 | Stretch ................ 701/103 |
| 2010/0186373 A1 | 7/2010 | Pierz et al. |
| 2010/0300083 A1 | 12/2010 | Uemoto |
| 2010/0312445 A1 | 12/2010 | Bogema et al. |
| 2011/0000194 A1 | 1/2011 | Gonze et al. |
| 2011/0023452 A1 | 2/2011 | Gisslen et al. |
| 2011/0107812 A1 | 5/2011 | Kasahara |
| 2011/0146253 A1 | 6/2011 | Isada et al. |
| 2011/0214415 A1 | 9/2011 | Thomas |
| 2011/0214643 A1 | 9/2011 | Blizard et al. |
| 2011/0232611 A1 | 9/2011 | Shaikh et al. |
| 2011/0248511 A1 | 10/2011 | Marlenee et al. |
| 2012/0003131 A1 | 1/2012 | Ibrahim et al. |
| 2012/0121475 A1 | 5/2012 | van Niekerk |
| 2012/0160934 A1 | 6/2012 | Ponnathpur et al. |
| 2012/0173062 A1 | 7/2012 | Kumar et al. |
| 2012/0180457 A1 | 7/2012 | Liu et al. |
| 2012/0204542 A1 | 8/2012 | Norris et al. |
| 2012/0208672 A1 | 8/2012 | Sujun et al. |
| 2013/0213013 A1 | 8/2013 | Mitchell et al. |
| 2013/0333355 A1 | 12/2013 | Lee et al. |
| 2014/0150405 A1 | 6/2014 | Johnson et al. |
| 2014/0150407 A1 | 6/2014 | Niekerk et al. |
| 2014/0150408 A1 | 6/2014 | Niekerk et al. |
| 2014/0150433 A1 | 6/2014 | Niekerk et al. |
| 2014/0154139 A1 | 6/2014 | Niekerk et al. |

FOREIGN PATENT DOCUMENTS

| | | |
|---|---|---|
| JP | 6501760 B2 | 2/1994 |
| WO | WO2008079003 A1 | 7/2008 |
| WO | WO2012033704 A2 | 3/2012 |
| WO | 2014089172 A1 | 6/2014 |
| WO | 2014089173 A1 | 6/2014 |

OTHER PUBLICATIONS

40 CFR Chapter 1 (7-1-12 Edition), Part 1039—Control of Emissions from New and In-Use Nonroad Compression Ignition Engines, 80 pages.

International Search Report issued in International Application No. PCT/US2013/073043, mailed Apr. 28, 2014, 2 pages.

International Search Report issued in International Application No. PCT/US2013/073048, mailed Apr. 28, 2014, 2 pages.

Tier 4 Regulations Affect More than Engines, Jun. 6, 2011, downloaded from http://www.power-eng.com/articles/pring/volume-115/issue-6/features/tier-4-regulations-af.

International Preliminary Examination Report issued in PCT/US2013/073048, completed Mar. 31, 2014, 10 pages.

International Preliminary Examination Report issued in PCT/US2013/073043, completed Jun. 9, 2015, 17 pages.

* cited by examiner

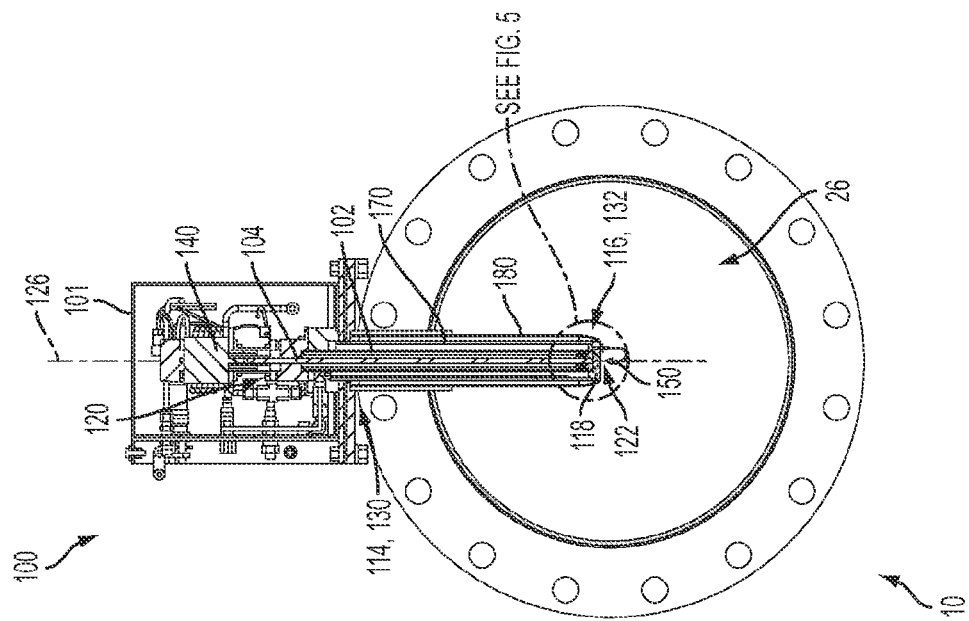
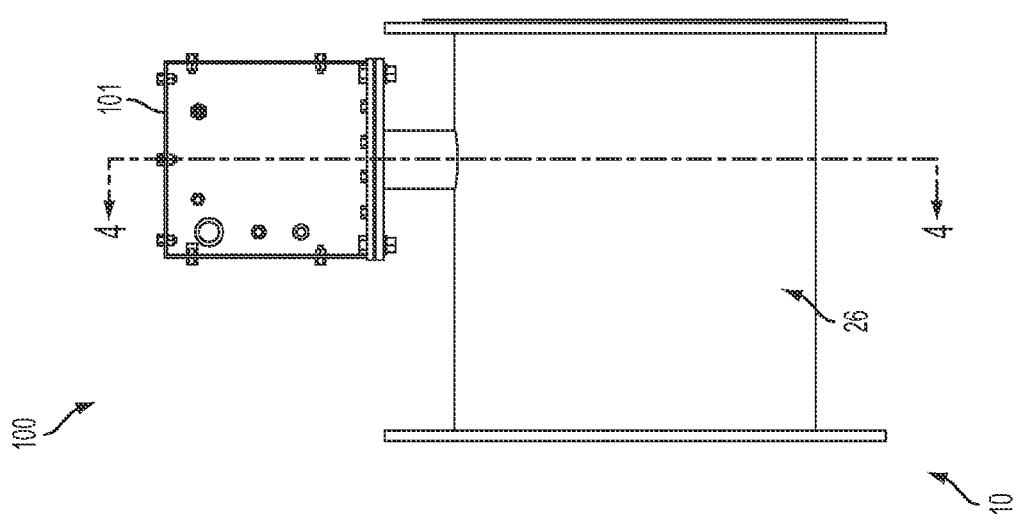

DIESEL EXHAUST FLUID INJECTOR ASSEMBLY

TECHNICAL FIELD

The present disclosure relates to diesel engine exhaust after-treatment systems and methods for reducing emissions. More specifically, the present disclosure relates to a diesel exhaust fluid (DEF) injector assembly for use in such after-treatment systems.

BACKGROUND

Diesel internal combustion engines produce and emit into the atmosphere exhaust streams containing various combustion byproducts. These exhaust streams may pollute and negatively impact the environment. Such exhaust streams may contain nitric oxides ($NO_x$), for example, which contribute to smog and acid rain. Such exhaust streams may also contain particulate matter (PM).

To reduce $NO_x$ emission levels, diesel internal combustion engines may be paired with Selective Catalytic Reduction (SCR) treatment systems. In general, an automotive grade DEF, such as a urea-based DEF solution, is injected into the exhaust stream upstream of a SCR catalyst. The urea decomposes and hydrolyzes to form ammonia ($NH_3$) which, in the presence of the SCR catalyst, reacts with the $NO_x$ in the exhaust stream and converts it into nitrogen, water, and small amounts of carbon dioxide ($CO_2$), all natural components of air.

SCR systems may use an injector assembly or nozzle to inject the DEF into the exhaust stream. The injected DEF should evaporate and be thoroughly mixed with the exhaust stream. However, in practice, some of the injected DEF may form unwanted crystals in and around the exhaust outlet of the injector assembly or surrounding structures, which may lead to clogging of the injector assembly and insufficient mixing with the exhaust stream.

SUMMARY

A diesel exhaust fluid (DEF) injector assembly is provided for use in an engine exhaust after-treatment system. The DEF injector assembly includes an injector body having a fluid inlet and a fluid outlet that delivers the DEF to an engine exhaust stream. The DEF injector assembly may also include a valve that opens and closes the fluid outlet of the injector body. An exemplary DEF injector assembly further includes an impact structure with an inclined impact surface that disperses and distributes the injected DEF into the engine exhaust stream. Another exemplary DEF injector assembly further includes a shroud that insulates the injector body.

According to an exemplary embodiment of the present disclosure, a DEF injector assembly is provided including an injector body and an impact structure. The injector body includes a proximal end portion, a distal end portion, a fluid pathway, a fluid inlet to the fluid pathway, a fluid outlet from the fluid pathway disposed at the distal end portion, the fluid outlet dispensing a fluid from the injector body along a longitudinal axis, and an impact structure positioned in fluid communication with the fluid outlet of the injector body, the impact structure having an impact surface that faces toward the injector body, a plane perpendicular to the longitudinal axis intersecting the impact surface, at least a portion of the impact surface deviating from the plane.

According to another exemplary embodiment of the present disclosure, a DEF injector assembly is provided for treatment of an exhaust stream. The DEF injector assembly includes an injector body and a shroud around the injector body. The injector body includes a proximal end portion, a distal end portion, a longitudinal axis, a fluid inlet, a fluid outlet at the distal end portion, the fluid outlet in fluid communication with the exhaust stream, and a fluid pathway extending between the fluid inlet and the fluid outlet. The shroud defines an air gap between the injector body and the exhaust stream.

According to yet another exemplary embodiment of the present disclosure, an exhaust treatment system is provided for an engine, the exhaust treatment system including a housing, a urea source, a fluid injector assembly, and a catalyst disposed downstream of the fluid injector assembly. The housing has inlet for receiving an exhaust stream from the engine and an outlet for discharging the exhaust stream. The fluid injector assembly has a longitudinal axis and includes a fluid inlet in fluid communication with the urea source, a fluid outlet in fluid communication with the exhaust stream, and an impact structure having an impact surface in fluid communication with the fluid outlet, wherein at least a portion of the impact surface is inclined relative to the longitudinal axis.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 3 is an elevational view of the mixing section and the DEF injector assembly of FIG. 2;

FIG. 4 is a cross-sectional view of the mixing section and the DEF injector assembly of FIG. 3, taken along line 4-4 of FIG. 3;

Figure 1:
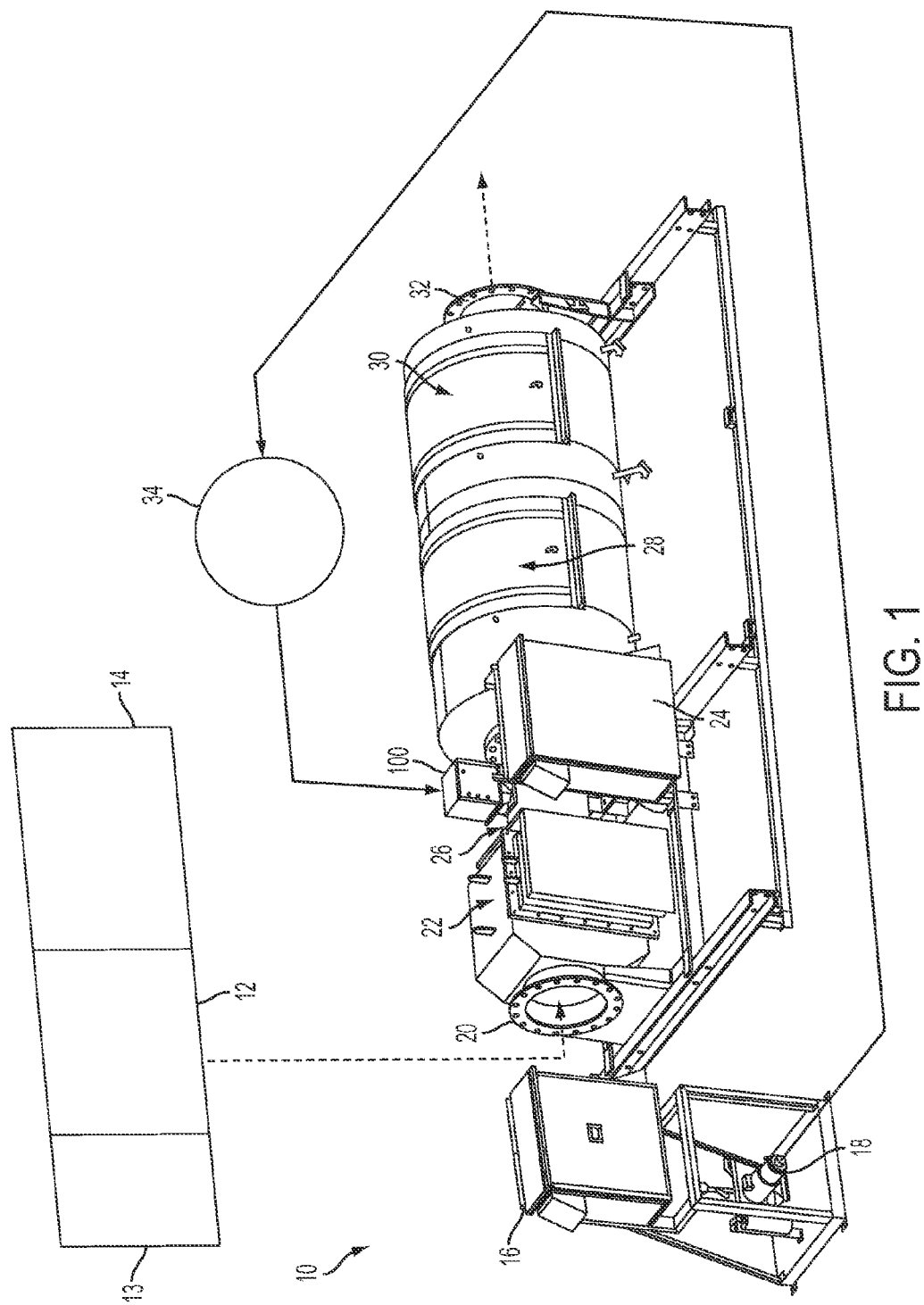
FIG. 1 is a schematic, perspective view of an exhaust after-treatment system in accordance with an embodiment of the invention, the system including a mixing section with a DEF injector assembly.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 depicts an exhaust after-treatment system 10 configured for operation with a diesel internal combustion engine 12 that is controlled by an engine control unit (ECU) 13 and used to power a generator 14 for generating electricity, for example. The illustrative system 10 includes a controller 16, a diesel exhaust fluid (DEF) pump 18, an exhaust inlet 20, a heating section 22 with an optional heating element (not shown) coupled to an exhaust heater power panel 24, a mixing section 26 with a DEF injector assembly 100, a diesel particulate filter (DPF) section 28, a SCR section 30 containing a suitable catalyst, an exhaust outlet 32, and a DEF source tank 34 which is connected to DEF pump 18 and DEF injector assembly 100. By way of example, one embodiment of system 10 is further described in U.S. patent application Ser. No. 13/706,038, titled EXHAUST AFTERTREATMENT PACKAGING FOR A DIESEL GENSET, which is being filed on the same day as the present application, the entire disclosure of which is expressly incorporated herein by reference. In other embodiments, injectors in accordance with the invention are used with other after-treatment systems.

In use, exhaust inlet 20 of system 10 receives an exhaust stream from engine 12 for treatment. The exhaust stream is heated in heating section 22, and then the exhaust stream travels to mixing section 26 to receive a DEF from DEF injector assembly 100, as discussed further below. One or more mixing devices (e.g., turbulators) may be provided in mixing section 26 to distribute the injected DEF throughout the exhaust stream. The exhaust stream next passes through DPF section 28, which removes particulate matter or soot from the exhaust stream. DPF section 28 may lack a filtration catalyst coating or element, allowing DPF section 28 to be located downstream of DEF injector assembly 100 (rather than upstream of DEF injector assembly 100, as in some prior art systems) without risk of the injected DEF being degraded by a subsequent filtration catalyst coating or element. The filtered exhaust stream then passes through the catalyst-containing SCR section 30, where the injected DEF and $NO_x$ in the exhaust stream react to form harmless air components in the manner described above. Finally, the air components are discharged from exhaust outlet 32.

Figure 2:
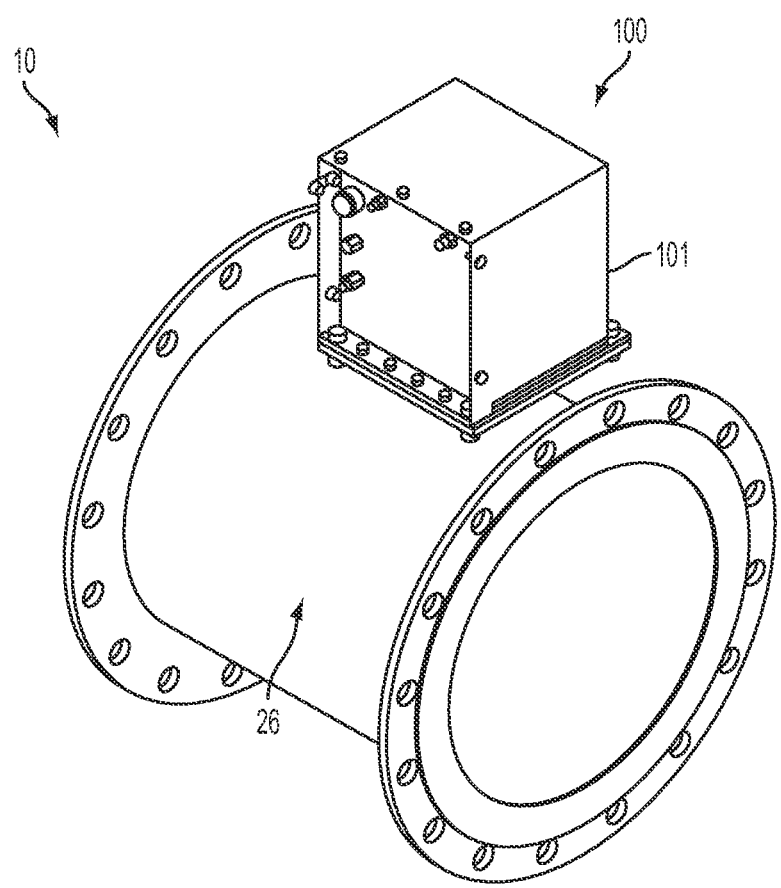
FIG. 2 is a partial perspective view of the system of FIG. 1 showing the mixing section and the DEF injector assembly.
Figure 5:
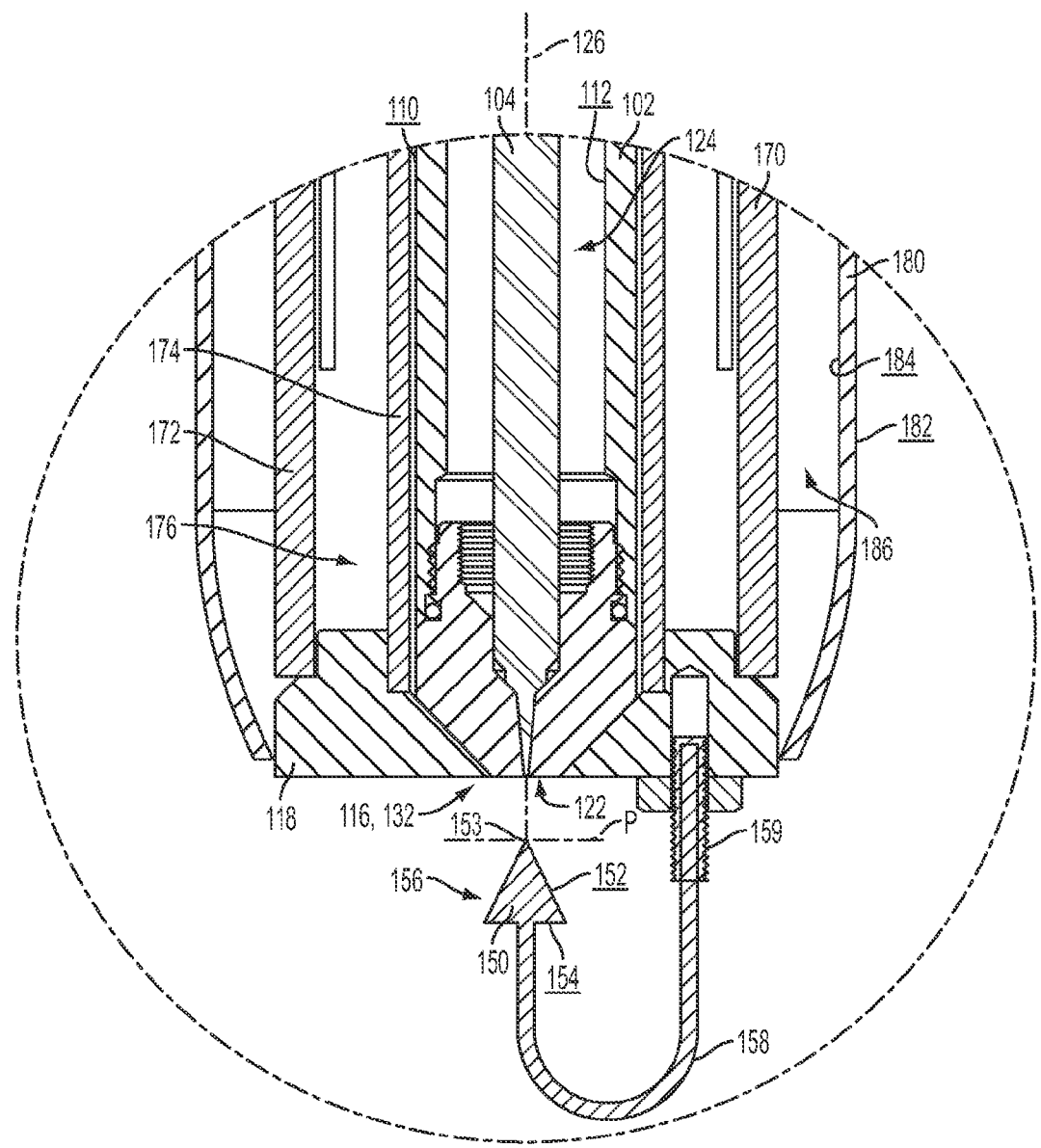
FIG. 5 is a detailed cross-sectional view of the circled portion of FIG. 4, the DEF injector assembly including a cone-shaped impact structure in accordance with an embodiment of the invention.

An airless DEF injector assembly 100 is shown in more detail in FIGS. 2-5. As shown in FIGS. 2 and 3, DEF injector assembly 100 includes an outer housing 101 mounted atop mixing section 26 of system 10. As shown in FIGS. 4 and 5, DEF injector assembly 100 further includes an injector body 102, illustratively a tube-shaped injector body 102, and a moveable valve, illustratively a rod-shaped or needle-shaped valve 104. Injector body 102 includes an outer surface 110, an inner surface 112, an upper, proximal end portion 114, and a lower, distal end portion 116 coupled to a distal base 118. As shown in FIG. 4, the upper, proximal end portion 114 of injector body 102 is located atop mixing section 26 of system 10, while the lower, distal end portion 116 of injector body 102 is located inside mixing section 26 of system 10. Injector body 102 also includes a fluid inlet 120 located near proximal end portion 114 of injector body 102 and a fluid outlet 122 located near distal end portion 116 of injector body 102. Inner surface 112 of injector body 102 defines a fluid passageway 124 that extends between fluid inlet 120 and fluid outlet 122 along a longitudinal axis 126.

Valve 104 is at least partially disposed inside fluid passageway 124 of injector body 102. Valve 104 includes an upper, proximal end 130 located near the corresponding upper, proximal end portion 114 of injector body 102, and a lower, distal tip 132 located near the corresponding lower, distal end portion 116 of injector body 102. Valve 104 is moveable along longitudinal axis 126 of injector body 102 between an opened position and a closed position. In the opened position, distal tip 132 of valve 104 is moved away from fluid outlet 122 of injector body 102, thereby allowing fluid in fluid passageway 124 to escape from fluid outlet 122 of injector body 102. In the closed position, distal tip 132 of valve 104 is moved into a sealed engagement with fluid outlet 122 of injector body 102, thereby preventing fluid in fluid passageway 124 from escaping from fluid outlet 122 of injector body 102.

Longitudinal movement of valve 104 between the opened and closed positions may be accomplished, for example, using a motor 140. Such movement is detailed in co-pending U.S. Patent Application Publication No. 2012/0121475, entitled FLUID INJECTOR, the entire disclosure of which is expressly incorporated herein by reference. For example, motor 140 may drive rotation of valve 104, and the rotating valve 104 may cooperate with a threaded region (not shown) of DEF injector assembly 100 to convert rotational movement of valve 104 into longitudinal movement of valve 104 through injector body 102. Advantageously, DEF injector assembly 100 may deliver near linear flow characteristics as a function of rotation of motor 140 over a wide range of operating conditions. Embodiments of DEF injector assembly 100 may have linear flow characteristics that are capable of yielding flow operating ranges of 10:1, which is particularly useful in the control of diesel engines.

In use, an aqueous, urea-based DEF or another suitable DEF is pumped from DEF source tank 34 (FIG. 1) via DEF pump 18 to fluid inlet 120 of the airless DEF injector assembly 100. The combined airless DEF injector assembly 100 and DEF pump 18 (e.g., a positive displacement pump) may eliminate the need for a compressed air source to deliver the DEF, so system 10 may be referred to herein as an airless system. From fluid inlet 120, the DEF enters fluid passageway 124 of injector body 102. If valve 104 is in the opened position, the DEF may escape from the exposed fluid outlet 122 of injector body 102 along longitudinal axis 126 and into the pre-heated exhaust stream traveling through mixing section 26 of system 10. Because the injected DEF travels through fluid outlet 122 along longitudinal axis 126, longitudinal axis 126 may also be referred to herein as a "fluid injection" axis. When urea is used as the DEF, for example, the pre-heated exhaust stream may be heated in heating section 22 (FIG. 1) to a temperature greater than about 450° F., more particularly greater than about 750° F., such as about 800° F., causing the urea to evaporate and hydrolyze into ammonia before or upon entering mixing section 26. In addition to urea, other suitable fluids for use as the DEF may include ammonia, fuel, or water, for example.

DEF injector assembly 100 may improve control over the injection process by controlling the amount of DEF that is discharged from injector body 102. For example, movement of valve 104 may be controlled to provide a desired level of DEF injected from injector body 102. In one embodiment, a sensor (e.g., a position feedback sensor) may be used to monitor and control the position of valve 104 within injector body 102. The position feedback sensor may send signals to controller 16 (FIG. 1), and controller 16 may then instruct motor 140 to adjust the position of valve 104 accordingly. For example, controller 16 may instruct motor 140 to move valve 104 into the fully closed position, thereby acting as a cleanout drive for any contamination that may have accumulated near the lower, distal end portion 116 of injector body 102. Controller 16 may also instruct motor 140 to move valve 104 into the fully opened position and/or into a partially opened position between the fully closed and fully opened positions. With valve 104 in the fully opened position, the DEF may be injected into mixing section 26 at a flow rate of about 0.1 gallon per minute, 0.2 gallon per minute, 0.3 gallon per minute, or more, for example. The DEF flow rate may vary depending on the size of system 10, the type and quantity of exhaust gases being treated, and other factors.

In certain prior art, air-driven DEF injectors, a compressed air stream is injected and/or impinged upon the DEF stream to break up and/or disperse the DEF stream without encouraging crystal growth. Often, such prior art systems require the expense and complexity of a separate air compressor system to provide the necessary compressed air stream. In embodiments of the present disclosure, by contrast, the airless DEF injector assembly 100 may include an impact structure 150 positioned downstream of fluid outlet 122, as shown in FIG. 5, to efficiently break up, disperse, and distribute the injected DEF into the exhaust gases of system 10, without needing a separate air compressor system to do so. Impact structure 150 is generally aligned with the longitudinal or fluid injection axis 126, thereby interrupting the flow path of the DEF exiting fluid outlet 122. The illustrative impact structure 150 includes an upper surface 152 that faces upward toward DEF injector assembly 100 and a lower surface 154 that faces downward away from DEF injector assembly 100. Impact structure 150 may also include side surfaces that extend parallel to longitudinal axis 126 of DEF injector assembly 100, the upper and lower surfaces 152, 154 being non-parallel to longitudinal axis 126 of DEF injector assembly 100. Upon exiting fluid outlet 122, the injected DEF may contact upper surface 152 of impact structure 150 and rapidly atomize into fine particles. Because upper surface 152 is positioned in fluid communication with the injected DEF and impacted by the injected DEF, upper surface 152 may also be referred to herein as an "impact" surface. Dispersing the DEF into fine particles may avoid the formation of large DEF droplets and/or DEF crystals.

According to an exemplary embodiment of the present disclosure, and as discussed further below, impact structure 150 is at least partially "ramped" or "inclined" relative to the longitudinal or fluid injection axis 126 of DEF injector assembly 100. In this embodiment, at least a portion 156 of upper surface 152 deviates from a single plane P through upper surface 152 that is perpendicular to longitudinal axis 126. This deviating portion 156 of upper surface 152 may also be referred to herein as an "inclined" portion or a "ramped" portion, for example. Stated differently, at least a portion 156 of upper surface 152 undergoes an elevational change along longitudinal axis 126. An exemplary deviating portion 156 begins at its highest elevation where the longitudinal or fluid injection axis 126 intersects impact structure 150.

Deviating portion 156 may encourage the DEF particles to roll, bounce, or otherwise fall off upper surface 152 and into mixing section 26 of system 10 (FIG. 1) to interact with the exhaust gases contained therein. If upper surface 152 were entirely flat (e.g., located entirely in a perpendicular plane P), by contrast, the DEF particles may be encouraged to stay atop the planar upper surface 152 and combine with adjacent particles to form large DEF droplets and/or DEF crystals. Because lower surface 154 need not interact with the injected DEF, lower surface 154 may be flat and planar, although the size and shape of lower surface 154 may vary.

Figure 6:
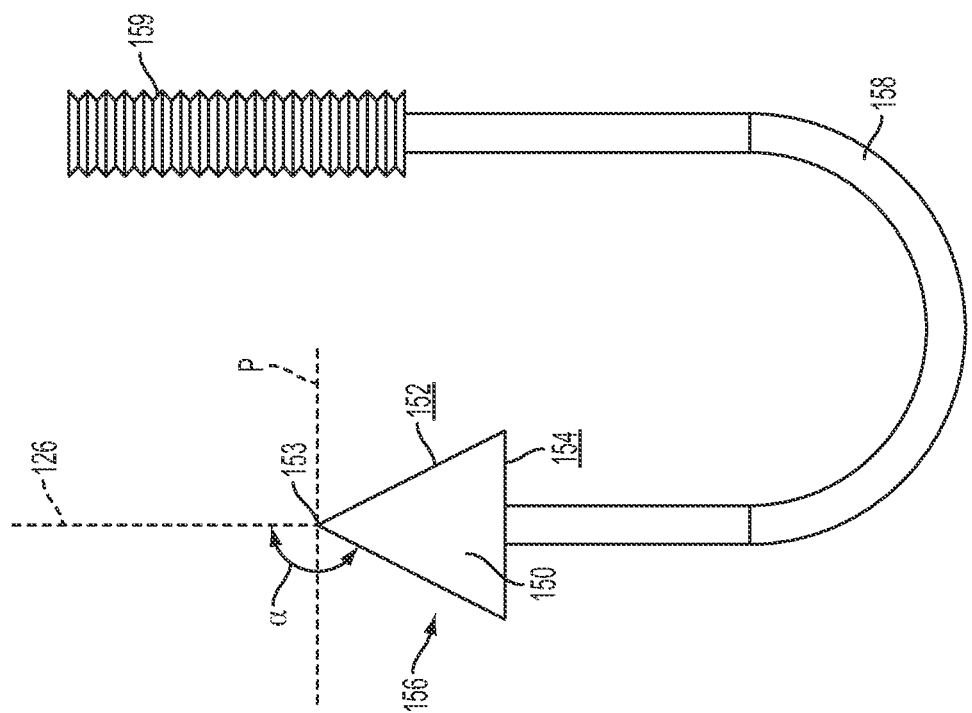
FIG. 6 is an elevational view of the cone-shaped impact structure of FIG. 5.

A first exemplary impact structure 150 is shown in FIGS. 5-6 in the form of a cone. Upper surface 152 of the cone-shaped impact structure 150 includes tip 153 that is generally aligned with longitudinal axis 126. FIG. 6 shows a plane P through tip 153 of upper surface 152 that is perpendicular to longitudinal axis 126, although the location of the perpendicular plane P through upper surface 152 may vary. Except for tip 153 of upper surface 152, in this embodiment, the rest of upper surface 152 deviates continuously and smoothly from the perpendicular plane P until reaching lower surface 154 to form deviating portion 156. Deviating portion 156 forms an angle $\alpha$ with longitudinal axis 126 between 90 degrees and 180 degrees, and more specifically about 135 degrees, as shown in FIG. 5. In this embodiment, the injected DEF may contact the smooth deviating portion 156 of the cone-shaped impact structure 150 to form DEF particles, and then the DEF particles may fall from the smooth deviating portion 156 of the cone-shaped impact structure 150. It is noted that other shapes for impact structure 150 and deviating portion 156 besides conical shapes are also contemplated. Impact structure 150 and deviating portion 156 may be shaped for a selected application to, in turn, shape and direct the resulting spray pattern for the selected application.

Figure 7:
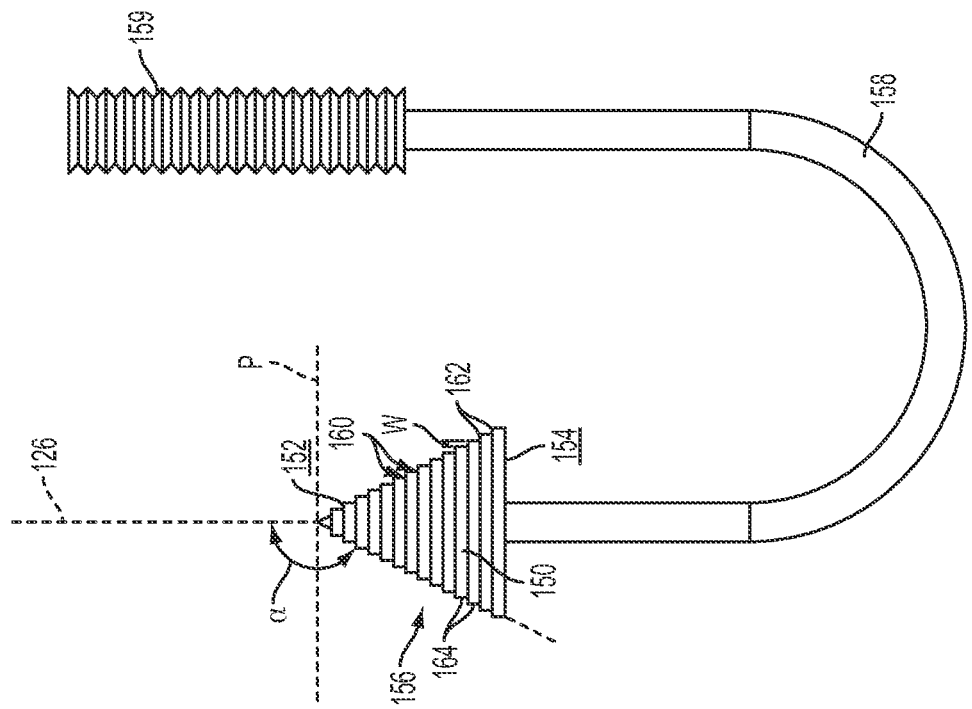
FIG. 7 is an elevational view of another cone-shaped impact structure in accordance with an embodiment of the invention.

Rather than being smooth, as shown in FIG. 6, deviating portion 156 of the cone-shaped impact structure 150 may include a plurality of steps 160, as shown in FIG. 7. In this embodiment, upper surface 152 of the cone-shaped impact structure 150 may include a plurality of upward facing flats 162 and a plurality of side facing risers 164. Each flat 162 may have a width W of about 0.005 inch, 0.010 inch, 0.015 inch, 0.020 inch, or more, for example. In this embodiment, the injected DEF may contact the plurality of flats 162 of the cone-shaped impact structure 150 to form fine DEF particles. The narrow width W of each flat 162 and the close proximity of the corresponding riser 164 may encourage the DEF particles to fall off of flats 162 rather than collecting on flats 162.

Figure 8:
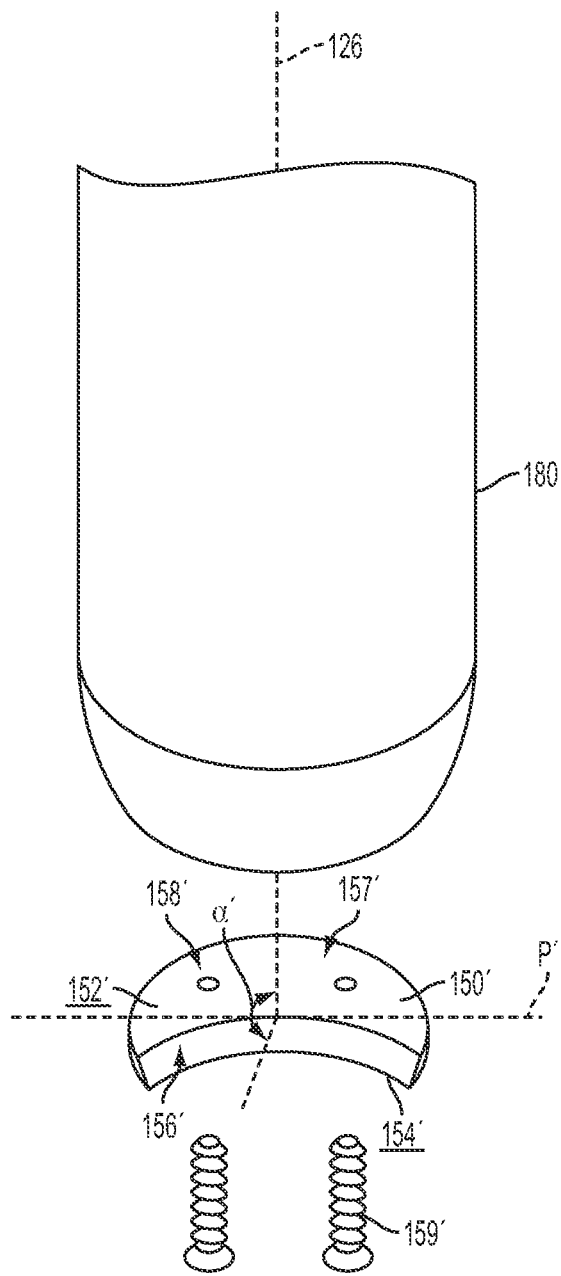
FIG. 8 is an exploded perspective view of a DEF injector assembly including a wedge-shaped impact structure in accordance with an embodiment of the invention.
Figure 9:
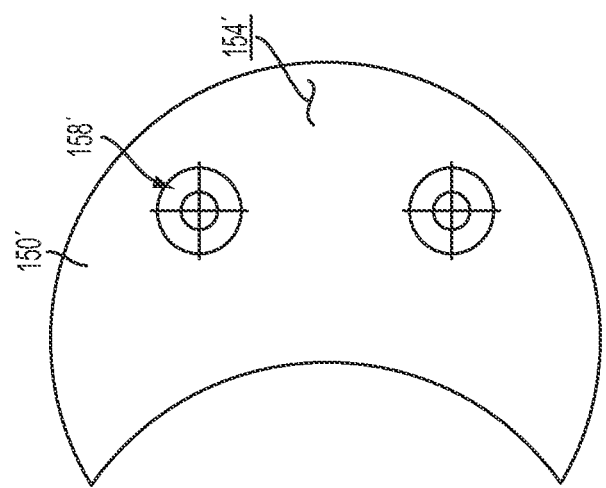
FIG. 9 is a top plan view of the wedge-shaped impact structure of FIG. 8.
Figure 10:
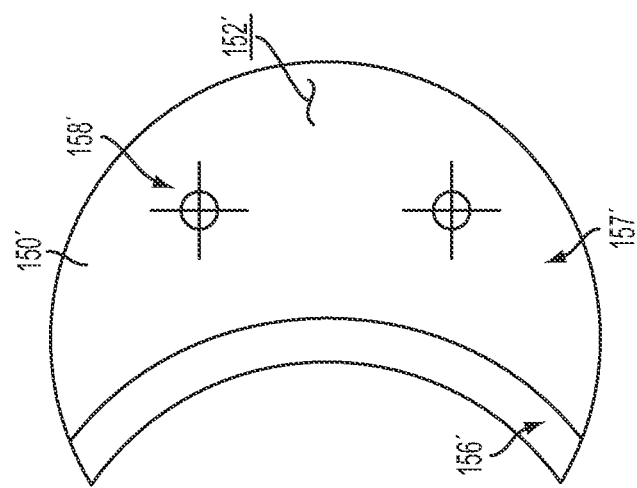
FIG. 10 is a bottom plan view of the wedge-shaped impact structure of FIG. 8.
Figure 12:
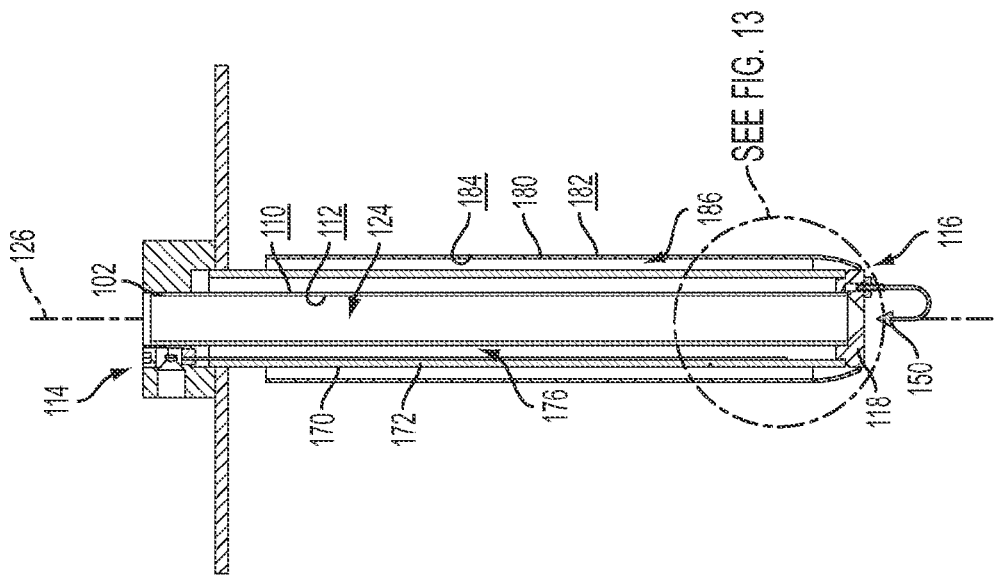
FIG. 12 is a cross-sectional view of the DEF injector assembly of FIG. 11, taken along line 12-12 of FIG. 11, the DEF injector assembly shown without a valve.
Figure 11:
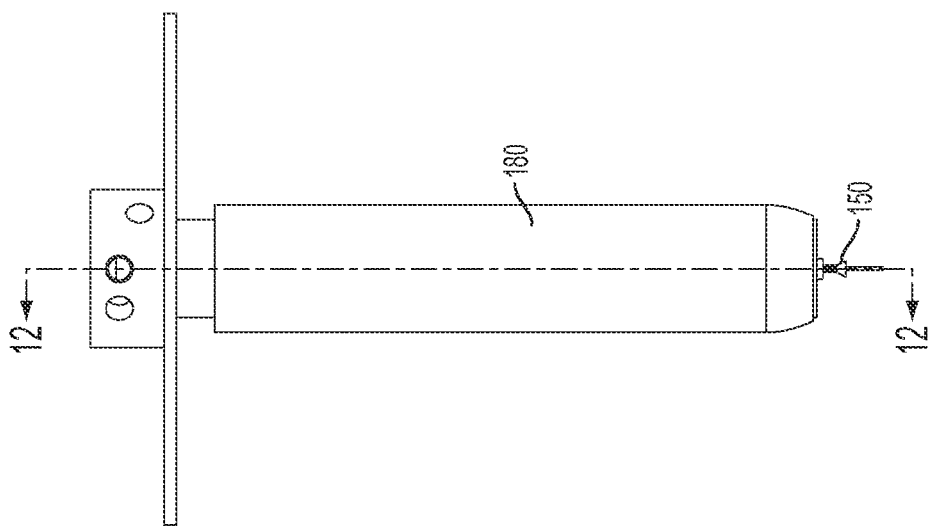
FIG. 11 is an elevational view of the DEF injector assembly of FIG. 2.

Another exemplary impact structure 150' is shown in FIGS. 8-10 in the form of a wedge. Upper surface 152' of the wedge-shaped impact structure 150' includes a generally planar portion 157', which illustratively makes up the majority of upper surface 152'. FIG. 8 shows a perpendicular plane P' through this generally planar portion 157'. Except for the generally planar portion 157', the rest of upper surface 152' deviates continuously and smoothly from the perpendicular plane P' until reaching lower surface 154' to form deviating portion 156'. Deviating portion 156' forms an angle $\alpha'$ with longitudinal axis 126 between 90 degrees and 180 degrees, and more specifically about 135 degrees, as shown in FIG. 8. Deviating portion 156' is also crescent-shaped, however, it is noted that straight, bowed out, or other shapes for deviating portion 156' are also contemplated to shape and direct the resulting spray pattern for the selected application. In this embodiment, the injected DEF may contact and then fall from the smooth deviating portion 156' of the wedge-shaped impact structure 150'. Rather than being smooth, as shown in FIGS. 8-10, it is within the scope of the present disclosure that deviating portion 156' may be stepped, as discussed above with respect to the cone-shaped impact structure 150 of FIG. 7.

Deviating portion 156, 156' may cause impact structure 150, 150' to increase in size along the longitudinal or fluid injection axis 126 of DEF injector assembly 100. In the illustrated embodiment of FIG. 5, for example, deviating portion 156 spans from tip 153 to lower surface 154, causing the cone-shaped impact structure 150 to expand outward from tip 153 to lower surface 154. Similarly, in the illustrated embodiment of FIG. 8, deviating portion 156' causes the wedge-shaped impact structure 150' to expand outward from the planar portion 157' of upper surface 152 'to lower surface 154'.

Measured in a direction perpendicular to longitudinal axis 126, at least a portion of impact structure 150, 150' may be substantially larger in size (e.g., diameter, width) than fluid outlet 122, such as 2 times, 3 times, or 4 times larger than fluid outlet 122. In the illustrated embodiment of FIG. 5, for example, the diameter of the cone-shaped impact structure 150, at least near lower surface 154, may be substantially larger than the diameter of fluid outlet 122. Although some of the injected DEF may stay within the circumference of fluid outlet 122, some of the injected DEF may spray radially outward from longitudinal axis 126 and beyond the circumference of fluid outlet 122. The large size of impact structure 150, 150' may encourage contact with the injected DEF, even as it travels away from longitudinal axis 126.

Various mounting structures may be provided to stabilize and attach the desired impact structure 150, 150' to DEF injector assembly 100. In the illustrated embodiments of FIGS. 5-7, for example, the cone-shaped impact structure 150 is coupled to a U-shaped arm 158 having a threaded end 159 for threading the cone-shaped impact structure 150 into DEF injector assembly 100, and more specifically into distal base 118 of DEF injector assembly 100. In the illustrated embodiment of FIGS. 8-10, for example, the wedge-shaped impact structure 150' includes one or more apertures 158' that receive threaded fasteners 159' for mounting the wedge-shaped impact structure 150' onto DEF injector assembly 100. When viewed from upper surface 152', as in FIG. 9, the illustrative wedge-shaped impact structure 150' is hemispherical in shape, like a crescent moon, to accommodate deviating portion 156' on one side and apertures 158' on the other side, but the wedge-shaped impact structure 150' may be provided in other shapes and sizes. Other suitable mounting structures include tripod-shaped arms, snaps, and hooks, for example. The surface area of the mounting structure exposed to the injected DEF should be minimized to limit the formation and/or retention of DEF droplets and/or DEF crystals thereon. With respect to the U-shaped arm 158 of FIGS. 5-7, for example, the injected DEF may advantageously impinge upon the arm 158 in a minimal manner, which may aid in avoiding crystal formation and/or retention thereon.

Referring next to FIGS. 5 and 11-13, DEF injector assembly 100 further includes a cooling sleeve or jacket 170 around injector body 102 to help control the temperature of the DEF in injector body 102. The illustrative cooling jacket 170 of FIG. 5 includes an outer wall 172 and an inner wall 174 that are spaced apart to define a fluid passageway 176 for a suitable heat transfer fluid. Unlike FIG. 5, the illustrative cooling jacket 170 of FIG. 13 lacks an inner wall. Rather, in FIG. 13, outer wall 172 of cooling jacket 170 cooperates with outer surface 110 of injector body 102 to form fluid passageway 176. Cooling jacket 170 may be supported atop and fastened to distal base 118 of DEF injector assembly 100. The temperature and flow rate of the heat transfer fluid flowing through fluid passageway 176 of cooling jacket 170 may be controlled to maintain the DEF in injector body 102 within a desired temperature range.

Maintaining the DEF within a desired temperature range may provide several benefits. For example, maintaining the DEF within a desired temperature range may prevent solidification or crystallization of the DEF within injector body 102, and in particular near the lower, distal end portion 116 of injector body 102. Such solidification could prevent proper seating of valve 104 against injector body 102 and could cause clogging of fluid outlet 122. As another example, maintaining a desired temperature range may protect various components of DEF injector assembly 100 and the DEF contained therein from detrimental effects associated with elevated temperatures, thereby improving the performance and increasing the life of these components and promoting proper injection and vaporization of the DEF while avoiding DEF decomposition and crystal growth.

In certain embodiments, the DEF to be injected from injector body 102 also serves as the heat transfer fluid in cooling jacket 170. For example, injector body 102 and cooling jacket 170 may both be in fluid communication with the same DEF source tank 34 (FIG. 1). In one embodiment, the DEF from DEF source tank 34 is split into two fluid streams—a first fluid stream being introduced into fluid passageway 124 of injector body 102 for injection, and a second fluid stream being introduced into fluid passageway 176 of cooling jacket 170 for cooling. In this embodiment, a small portion (e.g., about 20% or less) of the DEF from DEF source tank 34 may be directed to the first fluid stream for introduction into injector body 102, while a majority (e.g., about 80% or more) of the DEF from DEF source tank 34 may be directed to the second fluid stream for introduction into cooling jacket 170. In another embodiment, excess fluid that is not injected from injector body 102 continues on to cooling jacket 170, such as through a connecting passageway (not shown) between injector body 102 and cooling jacket 170 (or vice versa). The DEF that is not injected from injector body 102 may be returned to DEF source tank 34 and recirculated.

To insulate injector body 102 from the hot exhaust gases in system 10 (FIG. 1) and to further aid in airless DEF injection, a tubular shroud 180 may be provided around injector body 102. Shroud 180 may also surround cooling jacket 170, if provided. In the illustrated embodiment of FIG. 13, shroud 180 includes an outer surface 182 and an inner surface 184 that cooperates with outer wall 172 of cooling jacket 170 to define an air gap 186 therebetween. Air gap 186 may separate and insulate injector body 102 from the hot exhaust gases in system 10, thereby facilitating cooling of injector body 102 and the DEF contained therein and minimizing convective heat transfer from the hot exhaust gases to injector body 102. As discussed above, such cooling may prevent solidification of the DEF within injector body 102, improve the performance of DEF injector assembly 100, and increase the life of DEF injector assembly 100, for example. Shroud 180 may be especially important in system 10 of FIG. 1, for example, as DEF injector assembly 100 may be exposed to higher temperatures when DEF injector assembly 100 is located upstream of DPF section 28 (e.g., downstream of the optional exhaust heater 22) than when DEF injector assembly 100 is located downstream of DPF section 28. Air gap 186 may also aid in the thermal expansion and contraction of shroud 180 in system 10.

The thicknesses of shroud 180 and air gap 186 may be designed to provide adequate insulation of injector body 102. The thickness of shroud 180 between outer surface 182 and an inner surface 184 may be less than about 0.5 inch, such as about 0.1 or 0.2 inch, for example. The thickness of air gap 186 between inner surface 184 of shroud 180 and outer wall 172 of cooling jacket 170 may be less than about 1 inch, such as about 0.2 inch or 0.3 inch, for example. In certain embodiments, the thickness of air gap 186 in shroud 180 may be about the same as or less than the thickness of fluid passageway 176 in cooling jacket 170. Shroud 180 may be manufactured of sheet metal (e.g., stainless steel) or another suitable material.

Near the lower, distal end portion 116 of injector body 102, shroud 180 may interact with distal base 118 of DEF injector assembly 100. In the illustrated embodiments of FIG. 5 and FIG. 13, shroud 180 tapers smoothly inwardly to contact distal base 118. Such contact between shroud 180 and distal base 118 may facilitate securement of shroud 180 to distal base 118, such as via welding, a friction fit, and/or mechanical fasteners, for example. Also, such contact between shroud 180 and distal base 118 may close off air gap 186 distally from the hot exhaust gases in system 10 (FIG. 1), thereby preventing the hot exhaust gases from entering air gap 186 and surrounding injector body 102. Additionally, the tapering contact between shroud 180 and distal base 118 may minimize sharp edges between shroud 180 and distal base 118 that could form hot spots and/or encourage formation of DEF droplets and/or DEF crystals. Near the opposite, proximal end portion 114 of injector body 102, shroud 180 may be spaced apart from injector body 102 and cooling jacket 170 to receive relatively cool, stagnant exhaust gases or, alternatively, cool, ambient air in air gap 186. In an alternative embodiment, shroud 180 may be secured at the proximal end portion 114 of injector body 102 and may be closely fitted to distal base 118 of injector body 102 to allow for entry and maintenance of stagnant exhaust gases in air gap 186 while allowing for thermal expansion of shroud 180.

Figure 13:
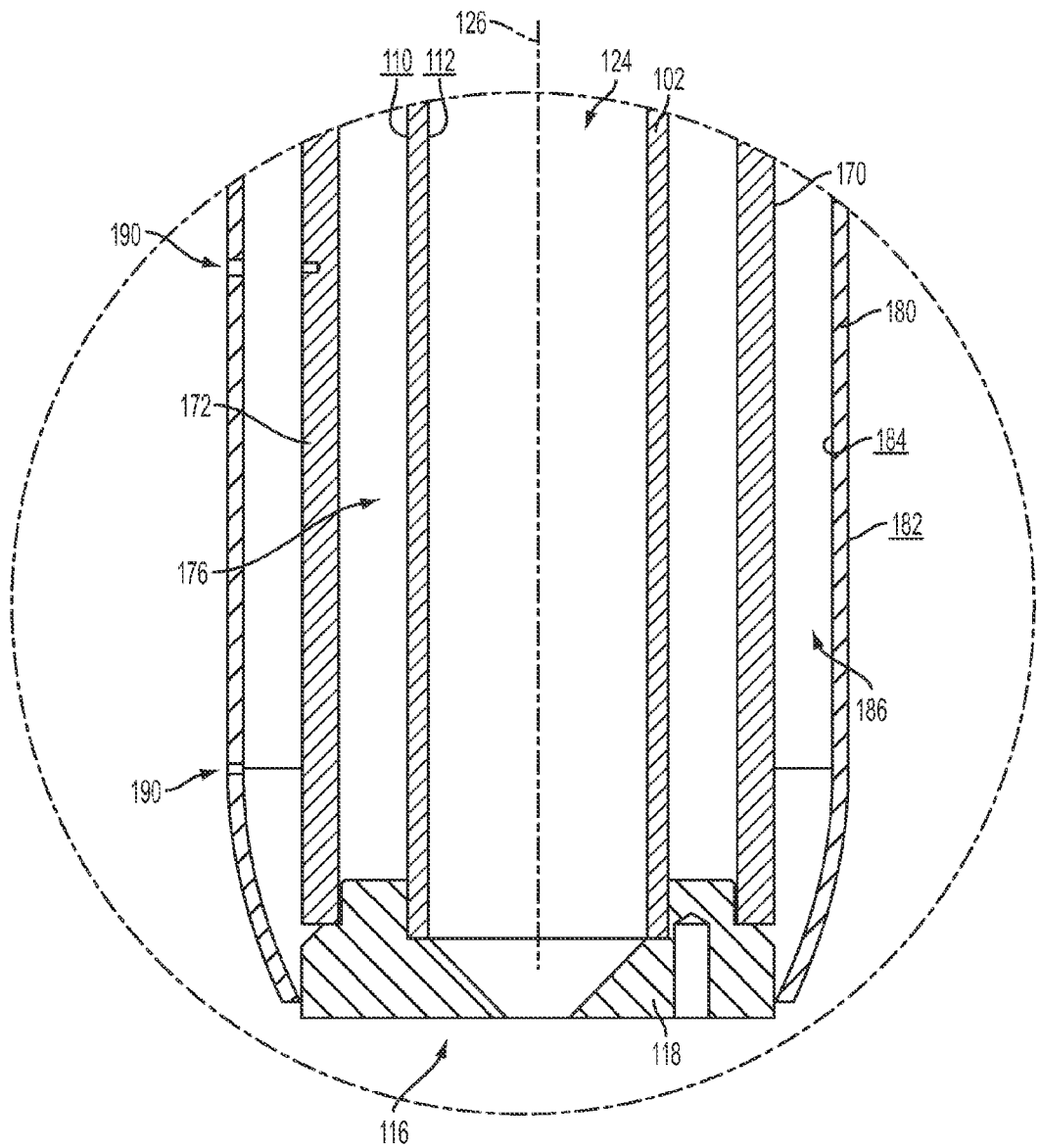
FIG. 13 is a detailed cross-sectional view of the circled portion of FIG. 12, the DEF injector assembly shown without the cone-shaped impact structure.

As shown in FIG. 13, cooling jacket 170 and/or shroud 180 may define one or more apertures 190 that are sized to receive thermocouples, thermometers, or other temperature sensors (not shown) therein. A temperature sensor may be used to monitor the temperature of cooling jacket 170 itself and/or the heat transfer fluid inside cooling jacket 170. Another temperature sensor may be used to monitor the temperature of the air inside shroud 180. The temperature sensors may communicate temperature data to controller 16 (FIG. 1), and in response, controller 16 may adjust various operating parameters of system 10, such as the heat supplied by heating section 22 and/or the flow rate of the heat transfer fluid in cooling jacket 170, for example.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A diesel exhaust fluid (DEF) injector assembly comprising:
    an injector body comprising:
    a proximal end portion;
    a distal end portion;
    a fluid pathway;
    a fluid inlet to the fluid pathway;
    a fluid outlet from the fluid pathway disposed at the distal end portion, the fluid outlet dispensing a fluid from the injector body along a longitudinal axis; and
    an impact structure positioned in fluid communication with the fluid outlet of the injector body, the impact structure having an impact surface that faces toward the injector body, a plane perpendicular to the longitudinal axis intersecting the impact surface, at least a portion of the impact surface deviating from the plane, wherein the impact structure is secured to the DEF injector assembly via one or more of a U-shaped arm, a tripod, a hook, a snap, and a fastener.

2. The DEF injector assembly of claim 1, wherein, in a direction perpendicular to the longitudinal axis, at least a portion of the impact structure is larger in size than the fluid outlet of the injector body.

3. The DEF injector assembly of claim 1, wherein the impact structure increases in size along the longitudinal axis from a first point proximate to the fluid outlet to a second point away from the fluid outlet.

4. The DEF injector assembly of claim 1, wherein the longitudinal axis intersects one of:
    the deviating portion of the impact surface of the impact structure; and
    a tip of the impact surface of the impact structure.

5. The DEF injector assembly of claim 1, wherein the deviating portion of the impact surface of the impact structure forms an angle with the longitudinal axis between 90 degrees and 180 degrees.

6. The DEF injector assembly of claim 5, wherein the angle is about 135 degrees.

7. The DEF injector assembly of claim 1, wherein the impact structure further comprises a plurality of steps in the deviating portion of the impact surface.

8. The DEF injector assembly of claim 1, wherein the impact structure is in the shape of a cone.

9. The DEF injector assembly of claim 1, wherein the impact structure has a planar upper surface proximate the injector body and a planar lower surface parallel to the planar upper surface, wherein the planar lower surface projects beyond the planar upper surface in an area that intersects the longitudinal axis to form the deviating portion of the impact surface.

10. The DEF injector assembly of claim 9, wherein the planar upper surface has a smaller surface area than the planar lower surface to form the deviating portion of the impact surface, the impact structure being one of hemispherical-shaped and crescent-shaped.

11. The DEF injector assembly of claim 1, further comprising a valve moveable relative to the injector body to open and close the fluid outlet of the injector body.

12. The DEF injector assembly of claim 1 and further comprising:
    a housing having an inlet for receiving an exhaust stream from an engine and an outlet for discharging the exhaust stream, wherein the fluid outlet of the injector body is in fluid communication with the exhaust stream;
    a urea source, wherein the fluid inlet of the injector body is in fluid communication with the urea source; and
    a catalyst disposed downstream of the DEF injector assembly.

13. The DEF injector assembly of claim 12 and further comprising a particulate filter section disposed downstream of the fluid injector assembly.

14. The DEF injector assembly of claim 13 and further comprising a heating section with at least one heating element disposed upstream of the particulate filter section.

15. A diesel exhaust fluid (DEF) injector assembly comprising:
    an injector body comprising:
    a proximal end portion;
    a distal end portion;
    a fluid pathway;
    a fluid inlet to the fluid pathway;

a fluid outlet from the fluid pathway disposed at the distal end portion, the fluid outlet dispensing a fluid from the injector body along a longitudinal axis; and an impact structure positioned in fluid communication with the fluid outlet of the injector body, the impact structure having an impact surface that faces toward the injector body, a plane perpendicular to the longitudinal axis intersecting the impact surface, at least a portion of the impact surface deviating from the plane, wherein the impact structure is secured to the DEF injector assembly via at least one threaded fastener, the impact structure defining at least one aperture that receives the at least one fastener.

16. A diesel exhaust fluid (DEF) injector assembly for treatment of an exhaust stream, the DEF injector assembly comprising:

an injector body comprising:
a proximal end portion;
a distal end portion;
a longitudinal axis;
a fluid inlet;
a fluid outlet at the distal end portion, the fluid outlet in fluid communication with the exhaust stream; and
a fluid pathway extending between the fluid inlet and the fluid outlet; and
a shroud around the injector body that defines an insulating air gap between the injector body and the exhaust stream to insulate the injector body from the exhaust stream.

17. The DEF injector assembly of claim 16, further comprising a cooling jacket located between the shroud and the injector body, the cooling jacket including a fluid passageway in communication with a heat transfer fluid.

18. The DEF injector assembly of claim 17, wherein the injector body and the cooling jacket are in fluid communication with the same urea source.

19. The DEF injector assembly of claim 16, wherein the shroud tapers inward toward the distal end portion of the injector body to close the air gap.

20. The DEF injector assembly of claim 16, further comprising a distal base coupled to the distal end portion of the injector body, wherein the shroud one of:
coupled to the distal base of the injector body and spaced apart from the proximal end portion of the injector body; and
coupled to the proximal end portion of the injector body and spaced apart from the distal base of the injector body.

21. The DEF injector assembly of claim 16, wherein the air gap of the shroud is open near the proximal end portion of the injector body.

22. The DEF injector assembly of claim 16 and further comprising:
a housing having an inlet for receiving the exhaust stream and an outlet for discharging the exhaust stream;
a urea source, wherein the fluid inlet of the injector body is in fluid communication with the urea source; and
a catalyst disposed downstream of the DEF injector assembly.

23. The DEF injector assembly of claim 22 and further comprising a particulate filter section disposed downstream of the fluid injector assembly.

24. The DEF injector assembly of claim 23 and further comprising a heating section with at least one heating element disposed upstream of the particulate filter section.

* * * * *